United States Patent [19]

Malinowski

[11] Patent Number: 5,544,998
[45] Date of Patent: Aug. 13, 1996

[54] SELECTIVELY RETRACTABLE VEHICLE LOAD FLOOR

[75] Inventor: Leo Malinowski, Detroit, Mich.

[73] Assignee: MascoTech Automotive Systems Group, Inc., Auburn Hills, Mich.

[21] Appl. No.: 221,129

[22] Filed: Mar. 31, 1994

[51] Int. Cl.$^6$ ............................................ B60P 1/00
[52] U.S. Cl. .................................. 414/522; 414/462
[58] Field of Search ........................ 414/462, 522, 414/523; 224/42.43, 42.44, 281

[56] References Cited

U.S. PATENT DOCUMENTS

| | | |
|---|---|---|
| 2,284,419 | 5/1942 | Greig . |
| 2,470,314 | 5/1949 | Lim . |
| 2,547,083 | 4/1951 | Lundgren . |
| 2,576,385 | 11/1951 | Bigsby . |
| 2,797,828 | 7/1957 | Fritsche . |
| 2,964,223 | 12/1960 | Sylvester . |
| 3,028,025 | 4/1962 | White . |
| 3,058,636 | 10/1962 | Bilbeisi . |
| 3,338,620 | 8/1967 | Cauvin . |
| 3,534,892 | 10/1970 | Truelove, Sr. ........................ 224/311 |
| 3,768,673 | 10/1973 | Nydam et al. ........................ 414/522 |
| 4,230,246 | 10/1980 | Wilson ................................. 224/42.21 |
| 4,260,314 | 4/1981 | Golze ................................... 414/462 |
| 4,303,367 | 12/1981 | Bott ..................................... 414/522 |
| 4,329,100 | 5/1982 | Golze ................................... 224/310 |
| 4,339,223 | 7/1982 | Golze ................................... 414/462 |
| 4,653,821 | 3/1987 | Faust ................................... 312/337 |
| 4,725,183 | 2/1988 | Smilie, III ........................... 414/345 |
| 4,752,095 | 6/1988 | Brady ................................. 296/37.6 |
| 4,799,849 | 1/1989 | Miller .................................. 414/462 |
| 4,824,158 | 4/1989 | Peters et al. ...................... 414/522 X |
| 4,841,883 | 6/1989 | Kukovich, Jr. ................... 414/522 X |
| 4,950,123 | 8/1990 | Brockhaus ........................... 414/522 |
| 4,969,678 | 11/1990 | Loisel ................................... 296/24.1 |
| 5,046,913 | 9/1991 | Domek et al. ....................... 414/522 |
| 5,052,878 | 10/1991 | Brockhaus ........................... 414/522 |
| 5,064,335 | 11/1991 | Bergeron ............................. 414/522 |
| 5,088,636 | 2/1992 | Barajas ................................ 224/281 |

FOREIGN PATENT DOCUMENTS 1097389  3/1981  Canada ................................. 414/522

*Primary Examiner*—James W. Keenan
*Attorney, Agent, or Firm*—Edgar A. Zarins; Malcolm L. Sutherland

[57] ABSTRACT

A selectively retractable load floor for the cargo compartment of a vehicle to improve access to cargo stored within the vehicle. The load floor includes a platform movable along dual rails for easy access to items stored even at the interior portion of the cargo compartment. The platform travels along low-profile rails to maximize interior cargo space and may be locked into position anywhere along the rail system. A spring-loaded latching system provides automatic locking to prevent inadvertent movement of the load floor. A single handle latch mechanism allows simple control of the movement of the platform.

17 Claims, 3 Drawing Sheets

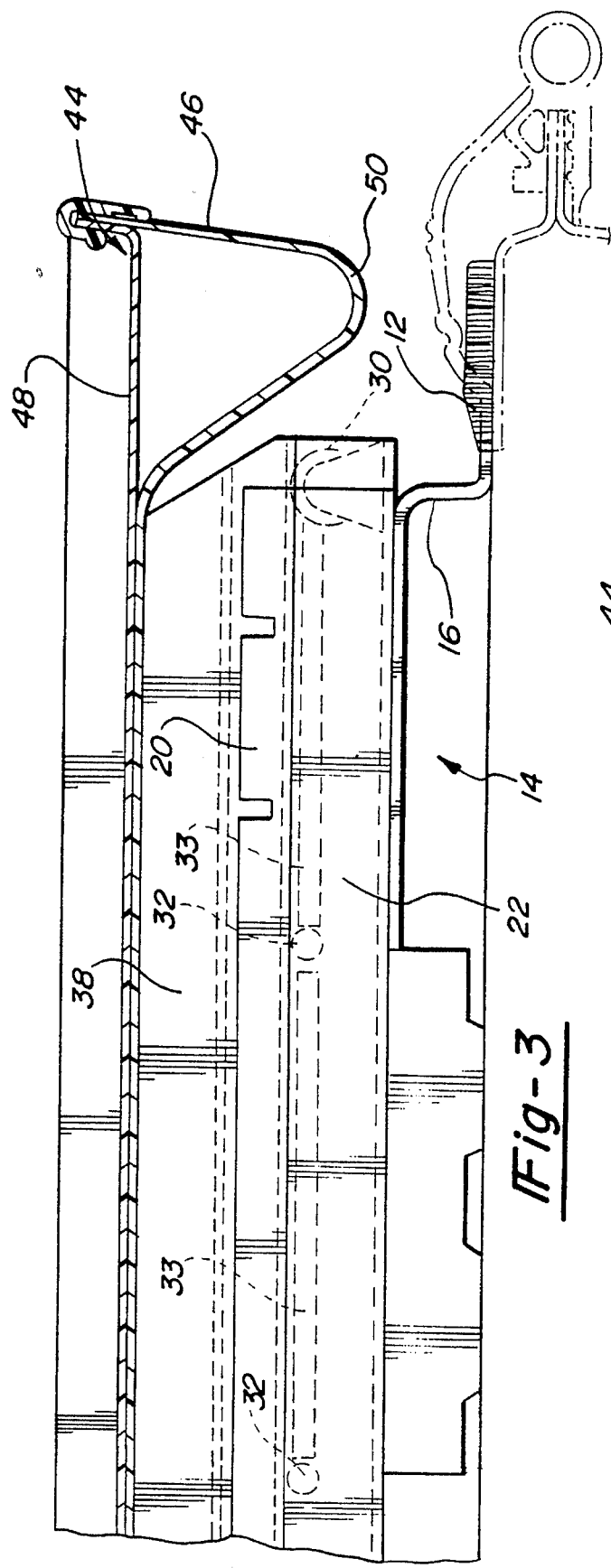
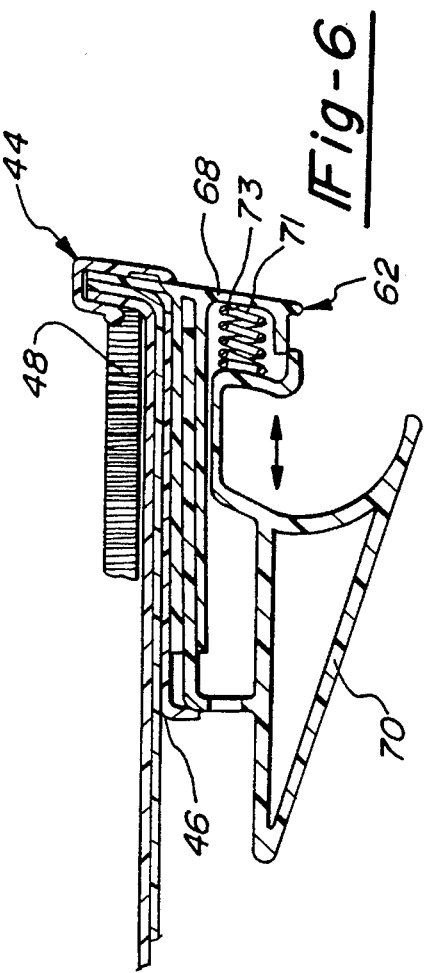

SELECTIVELY RETRACTABLE VEHICLE LOAD FLOOR

BACKGROUND OF THE INVENTION

I. Field of the Invention

This invention relates to load-bearing floors for the cargo compartment of a vehicle, and in particular, to a low-profile load floor which is selectively deployable within the cargo compartment for access to cargo loads stored in the vehicle.

II. Description of the Prior Art

With the increased popularity of utility vehicles, access to the entire cargo compartment can be difficult, particularly with heavy items. Even with liftable items, the length of the cargo compartment can make it difficult to access the item without climbing into the vehicle. In most instances, the package is first pushed rearwardly from one of the side passenger doors to facilitate access to the item. Thus, a means for improving access to cargo in modern utility vehicles is needed which does not detract from the aesthetic appeal of the interior compartment of such combined passenger/utility vehicles.

Traditional utility vehicles have been equipped with rugged load trays which slide out from the cargo compartment or bed to facilitate access to the cargo. Typically, these trays are more concerned with moving heavy loads than with the aesthetics of the vehicle or limitations on cargo space. Such prior known cargo boxes include exposed rails secured to the vehicle floor and on which the tray is slidably disposed. The prior cargo boxes simply move the cargo load into and out of the cargo compartment. No means are provided for automatically locking the cargo box in place at any point along its deployment. In most instances, a locking pin must be inserted into the tray to prevent movement of the platform.

SUMMARY OF THE INVENTION

The present invention overcomes the disadvantages of the prior known deployable vehicle cargo floors by providing a low-profile load floor which is easily retractable even with substantial cargo yet can be positively locked into position along its deployment upon release of the operating latch.

The load floor of the present invention includes a movable platform which is preferably covered in carpeting to match the interior of the cargo compartment thereby essentially concealing the load floor. The platform has a first rail system mounted to the floor of the cargo compartment. The rail system utilizes mating rails which are maintained in spaced sliding relationship by ball bearings and roller bearings thereby facilitating smooth operation while maintaining a low profile.

Deployment of the platform is controlled through a single, centrally located handle which controls the latching and unlatching of the platform. The handle is operatively connected to a pair of latches disposed beneath the platform proximate the rails. The latches include a rotatable latch selectively engageable with the fixed rail mounted to the vehicle floor to positively lock the platform against movement at discrete locations along the fixed rail. The latch mechanism is biased such that upon release the latch mechanism will lock the platform against further movement. As a result, the load platform is lockingly positionable at any of a plurality of positions along the rail system to allow selective deployment and convenient operation.

Other objects, features and advantages of the invention will be apparent from the following detailed description taken in connection with the accompanying drawing.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which:

FIG. 3 is a partial cross-sectional view of the load floor;

FIG. 6 is a cross-sectional view of the control handle of the latching assembly.

DETAILED DESCRIPTION OF A PREFERRED EMBODIMENT OF THE PRESENT INVENTION

Figure 1:
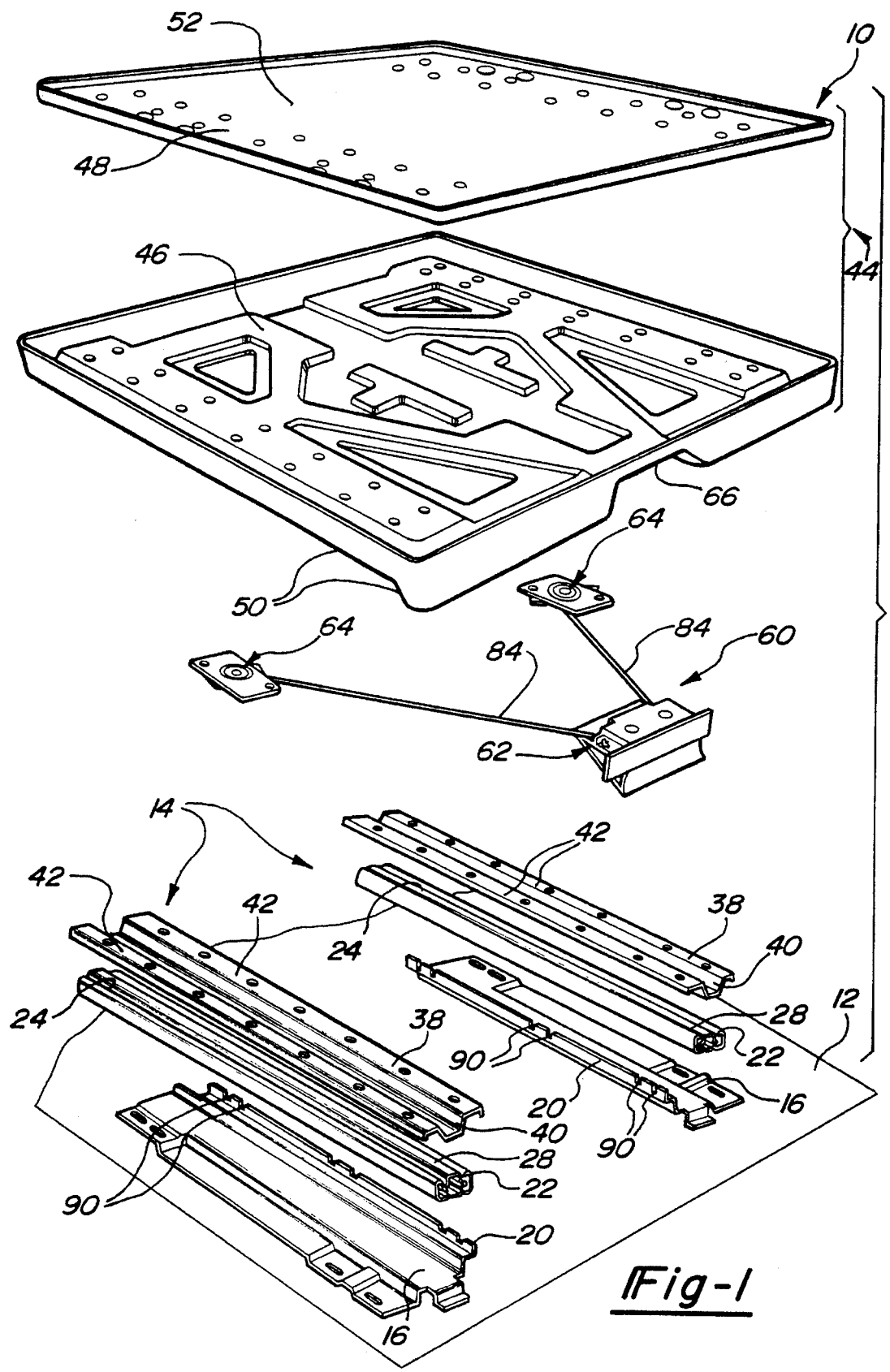
FIG. 1 is an exploded view of a deployable vehicle load floor embodying the present invention.

Referring first to FIG. 1, there is shown a preferred embodiment of a selectively deployable load floor 10 for a cargo compartment of a vehicle. The load floor 10 is adapted to support cargo loads and facilitate selective movement of the cargo into and out of the cargo compartment. In the preferred embodiment, the load floor 10 is designed to be mounted within the interior of an enclosed cargo compartment of a utility vehicle but may be adapted for exposed compartments such as pickup truck beds. The load floor assembly 10 is secured to a floor 12 of the cargo compartment thereby forming a secondary floor extending across the cargo compartment.

Figure 2:
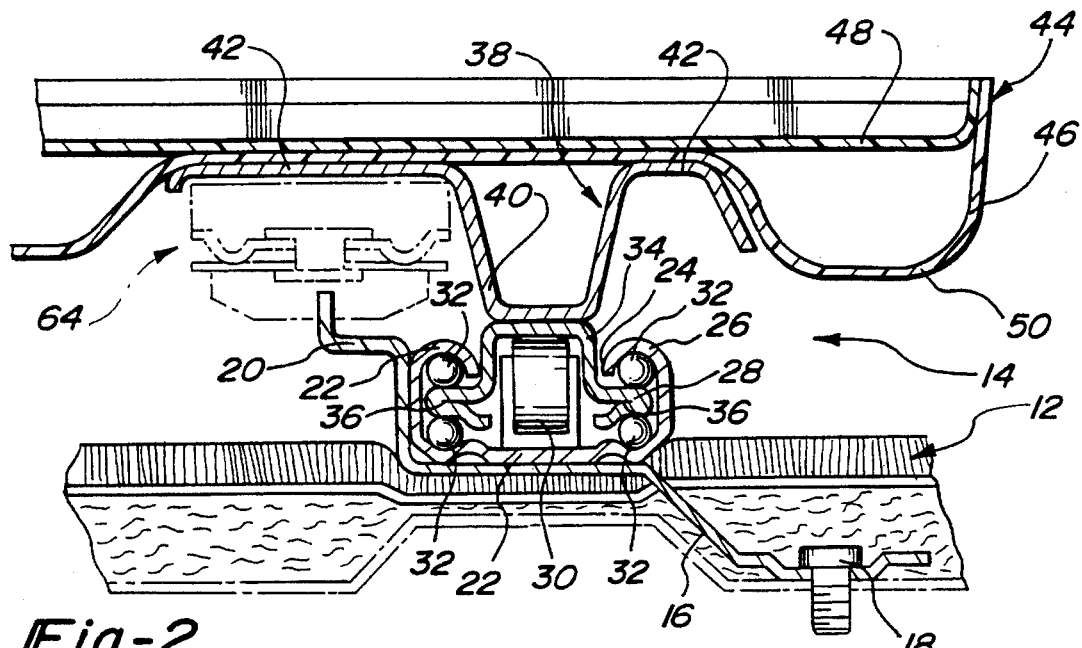
FIG. 2 is a lateral cross-sectional view of the rail system forming a part of the present invention.

Referring now to FIGS. 1 through 3, the load floor 10 is movably supported by a rail system secured to the cargo compartment floor 12. The rail system preferably consists of a pair of low-profile rails 14 with mating components providing telescoping movement. The rails 14 include an elongated base plate 16 secured to the vehicle floor 12 by appropriate fasteners 18 to prevent movement of the rails 14. The base plate 16 preferably includes an upwardly extending guide flange 20 which acts as a guide for the rail 14 and forms a part of the means for locking the load floor 10 against movement as will be subsequently described. Received by the base plate 16 is a track housing 22. The track housing 22 is secured to the base plate 16 and includes an elongated slot 24 along the top 26 of the housing 22. In a preferred embodiment, the track housing 22 has a substantially rectangular cross-sectional configuration facilitating nesting mounting on the base plate 16.

Telescopingly matingly received within the track housing 22 is a rail 28. The rail 28 is supported within the housing 22 by at least one roller bearing 30 and a plurality of ball bearings 32 to provide smooth reciprocating movement of the rail 28 within the track housing 22. In order to maintain optimum spacing and prevent binding of the bearings 32, at least one spacer 33 is disposed within the ball bearing 32 channel. In a preferred embodiment, the rail 28 comprises an elongated central beam 34 and a pair of side said flanges 36 extending outwardly from the sides of the beam 34. The central beam 34 extends through the slot 24 of the track housing 22 in order to movably support the load floor as will be described. The beam 34 is supported within the track housing 22 by the roller bearings 30 mounted within the housing 22 and supporting the underside of the beam 34. A plurality of ball bearings 32 are captured within the housing 22 in rolling engagement with the side flanges 36 of the rail 28. In a preferred embodiment, ball bearings 32 are provided both below and above the flanges 36 to stabilize the rail 28 within the track housing 22 yet allow reciprocal movement therebetween. The nylon spacers 33 maintain the desired spacing for smooth operation. As a result, the rail 28 is fully supported within the track housing 22 facilitating freedom of movement under even extreme and/or uneven loads.

Secured to the rail 28, specifically the central beam 34 extending through the track slot 24, is an elongated support guide 38 for reciprocal movement with the rail 28. The elongated support 38 also includes a central beam 40 which matches up with and is directly secured to the beam 34 of the rail 28. Extending outwardly from the central beam 40 of the support 38 are support flanges 42 which increase the supporting mounting surface of the support guide 38.

The elongated supports 38 directly support the load platform 44 which receives any cargo load. The platform 44 preferably consists of a molded, composite, or steel stamped tray 46 directly mounted to the rail assemblies 14, specifically the supports 38, and an insert 48. The tray 46 is mounted to the flanges 42 of the supports 38 for reciprocal movement with the rails 28. The tray 46 is preferably made to the specifications of the vehicle cargo compartment so as to extend across the full length and width of the cargo compartment. The tray 46 is also molded with a peripheral lip 50 extending downwardly from the plane of the tray 46 so as to at least partially conceal and protect the rail system 14. The insert 48 is designed to conceal any fasteners and provide a planar load surface 52 for the platform 44. The insert 48 may form many types of surfaces 52, including a damage resistant plastic or carpeting, according to manufacturers specifications.

While the rail system of the load floor 10 provides smooth reciprocal movement of the platform 44, a latching system 60 is provided to selectively maintain the platform in a desired position. The latching system 60 includes a single, centrally disposed control handle 62 operatively connected to latching mechanism 64 associated with each rail assembly 14. The latching system 60 is disposed beneath the platform 44 so as to be concealed from view and the accumulation of dirt and grime. The control handle 62 is preferably mounted to the tray 46 within a molded opening 66 within the rear edge of the tray 46. As shown in FIG. 6, the control handle 62 is preferably of a molded or extruded construction comprising a bracket 68 and a movable slider 70 received by the bracket 68. The handle 62 is molded or extruded to facilitate one-handed engagement of the slider 70 to selectively release the platform 44. The slider 70 is biased towards the locking position by a spring 71 positionally captured within a cavity 73 formed within the handle 62.

Figure 4:
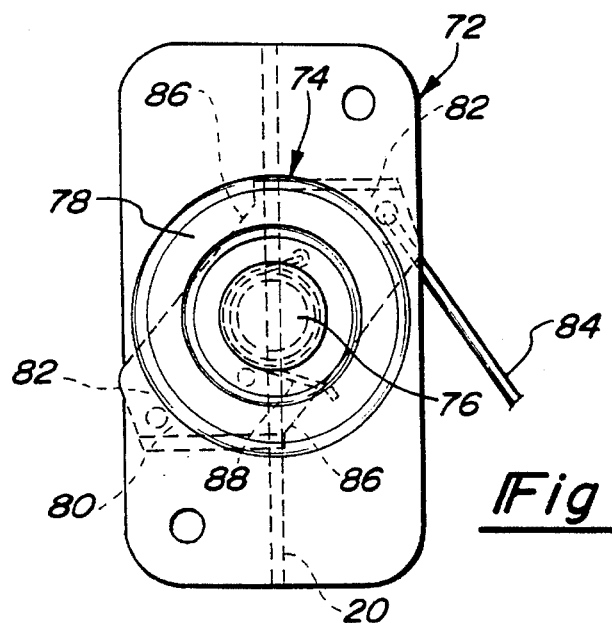
FIG. 4 is a plan view of the latching mechanism for the rail system.
Figure 5:
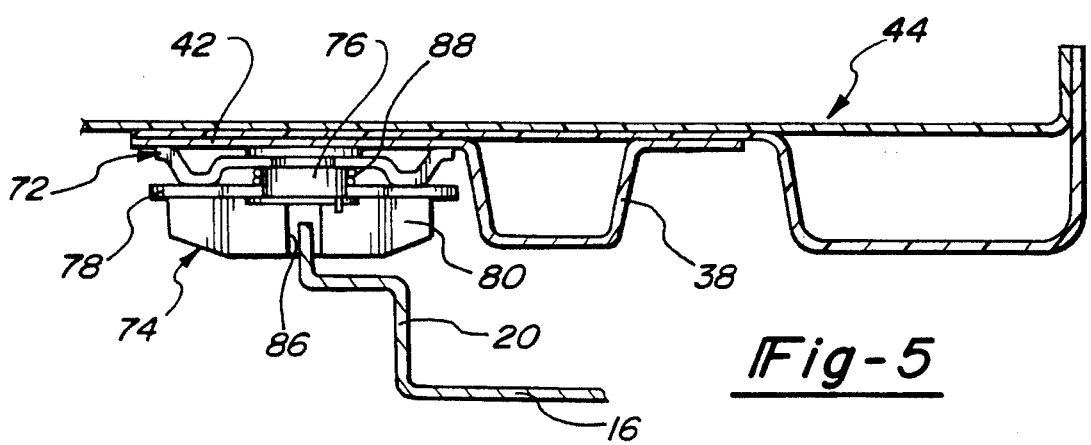
FIG. 5 is an end view of the latching mechanism in conjunction with the rail system.

Referring now to FIGS. 2, 4 and 5, latching mechanisms 64 are provided for each rail assembly 14. The latching mechanisms 64 are preferably mounted to the underside of the support flange 42 although they may be mounted directly to the tray 46. The latching mechanisms 64 receive the guide flange 20 as will be described in connection with the description of operation of the load floor 10. The latching mechanisms 64 include a mounting plate 72 used to secure the mechanism 64 to the support flange 42 and a rotatable latch 74 connected to the plate 72 by an axial hub 76. The rotatable latch 74 preferably includes a circular plate 78 and a latching drum 80 integrally formed with the circular plate 78. The latching drum 80 includes outwardly extending ears 82 which are operatively connected to the control handle 62 by a connecting cable or rod 84. The latching drum 80 has at least two oppositely disposed openings 86 formed therein through which the guide flange 20 can selectively travel. The openings 86 are selectively brought into alignment with the guide flange 20 upon rotation of the drum 80 in a first direction. The latching drum 80 is biased in a second direction by a spring 88 mounted to the hub 76 and connected to the rotating drum 80 thereby biasing the drum 80 towards the latching position, preventing travel of the guide flange 20 through the latching mechanisms 64, specifically the latching drum 80. The guide flange 20 is provided with a plurality of discretely positioned notches 90 into which the wall of the latching drum 80 rotates preventing longitudinal movement along the guide flange 20.

Operation of the present invention provides convenient access to cargo stored within the cargo compartment of a vehicle by allowing the user to selectively slide the cargo towards the access door of the vehicle, typically the rear of the vehicle. Additionally, the latching system of the present invention allows the load floor to be automatically locked into place along its length of travel upon release of the control handle thereby preventing inadvertent movement of the platform. With the platform 4 fully retracted within the vehicle, the user simply pulls on the slider 70 of the control handle 62 which in turn pulls the cables 84 rotating the latching drums 80 of the latching mechanisms 64. Rotation of the drums 80 moves the wall of the drum from the notches 90 of the guide flange 20 thereby aligning the openings 86 with the guide flange 20. While maintaining tension on the control handle 62, the platform 44 can be withdrawn as the latching mechanisms 64 move along the guide flange 20. Upon release of the slider 70 the spring 88 will bias the drum 80 in the second direction inserting the walls of the drum 80 into respective notches 90 along the guide flange 20. In the event the drum 80 is not aligned with appropriate notches 90, the spring 88 will maintain the drum 80 biased against the guide flange 20 until insertion into corresponding notches 90 is made possible by further longitudinal movement of the platform 44. Engagement of the control handle 62 again will allow the user to move the platform into or out of the cargo compartment of the vehicle.

The foregoing detailed description has been given for clearness of understanding only and no unnecessary limitations should be understood therefrom as some modifications will be obvious to those skilled in the art without departing from the scope and spirit of the appended claims.

What is claimed is:

1. A selectively deployable load floor for a cargo compartment of a vehicle, said load floor reciprocally movable within the vehicle cargo compartment, said load floor comprising:

at least one rail assembly mounted to a floor of the cargo compartment, said at least one rail assembly including a stationary track housing having interior walls and a rail reciprocatingly matingly received within said track housing, said rail being supported in spaced apart relation from said interior walls of said track housing by bearing means engaging said rail and said interior walls of said track housing to facilitate reciprocating movement of said rail within said track housing;

a load platform connected directly to said rail of said at least one rail assembly for reciprocating movement therewith while maintaining a low profile for said load platform within the cargo compartment; and means for latching said load platform against movement within the cargo compartment, said latching means including a latching mechanism mounted proximate said at least one rail assembly and biased into locking engagement with said at least one rail assembly preventing movement of said platform, said latching mechanism associated with said at least one rail assembly being operatively connected to a control handle for disengaging said latching means to facilitate reciprocal movement of said load platform, said latching mechanism including a rotatable drum rotatably biased in a first direction, said drum having a circumferential wall selectively engageable with said stationary track housing to prevent movement of said platform, said latching means selectively locking said load platform at any one of a plurality of discrete positions along said at least one rail assembly.

2. The load floor as defined in claim 1 wherein said load platform includes a tray secured to said rail of said at least one rail assembly and a planar insert received within said tray.

3. The load floor as defined in claim 1 wherein said track housing includes a longitudinal slot, said rail having an elongated beam extending at least partially through said slot.

4. The load floor as defined in claim 3 and further comprising an elongated support secured to said beam of said rail for reciprocal movement with said rail, said load platform secured to said elongated support of said at least one rail assembly.

5. The load floor as defined in claim 1 wherein said track housing is mounted to an elongated base plate secured to the floor of the cargo compartment.

6. The load floor as defined in claim 5 wherein said elongated base plate of said at least one rail assembly includes a longitudinal guide flange, said latching mechanism selectively engaging said guide flange preventing movement of said platform.

7. The load floor as defined in claim 6 wherein said circumferential wall includes a pair of oppositely disposed openings formed in said wall, said openings receiving said guide flange of said base plate whereby upon alignment of said openings with said guide flange said latching mechanism is free to move along said guide flange facilitating reciprocal movement of said platform.

8. The load floor as defined in claim 7 wherein said guide flange includes a plurality of notches defining discrete positions along said base plate, said wall of said rotatable drum being inserted into at least one notch upon rotation of said drum in said first direction, rotation of said drum in a second direction removing said wall from said at least one notch aligning said openings with said guide flange for reciprocal movement of said platform.

9. The load floor as defined in claim 8 wherein said latching mechanism associated with said at least one rail assembly is operatively connected to a single control handle, said control handle being centrally disposed along one edge of said load platform whereby engagement of said control handle rotates said drum in said second direction to facilitate reciprocal movement of said load platform and release of said control handle biases said drum in said first direction latching said platform in position.

10. A selectively deployable load floor for a cargo compartment of a vehicle, said load floor reciprocally movable within the vehicle cargo compartment, said load floor comprising:

a pair of rail assemblies mounted to a floor of the cargo compartment, said rail assemblies including a fixed base and a rail reciprocatingly received by said base;

a load platform connected to said rail of said rail assemblies for reciprocating movement therewith; and means for latching said load platform against movement within the cargo compartment, said latching means selectively locking said load platform at any one of a plurality of discrete positions along said rail assemblies;

said latching means including a latching mechanism mounted beneath said platform proximate each of said rail assemblies for reciprocating movement with said platform, said latching mechanism operatively connected to a single control handle mounted to said platform, said latching mechanism biased into engagement with said fixed base to prevent movement of said load platform and including a rotatable drum rotatably biased in a first direction, said drum having a circumferential wall selectively engageable with said base to prevent movement of said platform, said latching mechanism locking said platform against movement when said circumferential wall is biased into engagement with said base and said latching mechanism releasing said platform for reciprocating movement when said circumferential wall is retracted from said base, engagement of said control handle operatively overcoming said bias to release said latching mechanism for reciprocal movement of said load platform.

11. The load floor as defined in claim 10 wherein said base includes an elongated base plate secured to the cargo compartment floor and a track housing having interior walls mounted to said base plate, said base plate having a longitudinal guide flange and said track housing having a longitudinal slot.

12. The load floor as defined in claim 11 wherein said guide flange includes a plurality of notches defining discrete positions along said base plate and said rotatable drum includes a pair of oppositely disposed openings formed in said circumferential wall, said latching mechanisms locking said platform against movement when said circumferential wall is biased into at least one notch of said guide flange and said latching mechanism releasing said platform for movement when said openings of said drum are aligned with said guide flange thereby retracting said circumferential wall from said at least one notch of said guide flange.

13. The load floor as defined in claim 11 wherein said rail is reciprocatingly received within said track housing, said rail supported in spaced apart relation from said interior walls of said track housing by bearing means engaging said rail and said interior walls of said track housing.

14. A selectively deployable load floor for a cargo compartment of a vehicle, said load floor reciprocally movable within the vehicle cargo compartment, said load floor comprising:

a plurality of rail assemblies mounted to a floor of the cargo compartment, said rail assemblies including a fixed base and a rail reciprocatingly received by said base, said base having an elongated track housing with a longitudinal slot and interior walls, said rail reciprocatingly received within said track housing and supported in spaced apart relation from said interior walls of said track housing by bearing means engaging said rail and said interior walls of said track housing, said rail extending at least partially through said slot in said track housing;

a load platform connected to said rail of said rail assemblies for reciprocating movement therewith; and means for latching said load platform against movement within the cargo compartment, said latching means selectively locking said load platform at any one of a plurality of discrete positions along said rail assemblies;

said latching means including a latching mechanism mounted beneath said platform proximate each of said rail assemblies for reciprocating movement with said platform, said latching mechanisms operatively connected to a single central handle mounted to said platform, said latching mechanisms including a rotatable drum rotatably biased into engagement with said fixed base to prevent movement of said load platform, said drum having a circumferential wall selectively engageable with said base at discrete positions along said base to prevent movement of said platform, said latching mechanisms locking said platform against movement when said circumferential wall is biased into engagement with said base and engagement of said control handle operatively overcoming said bias to release said circumferential wall of said latching mechanism from engagement with said base for reciprocal movement of said load platform.

15. A selectively deployable load floor for a cargo compartment of a vehicle, said load floor reciprocally movable within the vehicle cargo compartment, said load floor comprising:

a pair of rail assemblies mounted to a floor of the cargo compartment, said rail assemblies including a fixed base and a rail reciprocatingly received by said base, said base including an elongated base plate secured to the cargo compartment floor and a track housing mounted to said base plate, said base plate having a longitudinal guide flange with a plurality of notches defining discrete positions along said base plate and said track housing having a longitudinal slot; and means for latching said load platform against movement within the cargo compartment, said latching means selectively locking said load platform at any one of said discrete positions along said base plate;

said latching means including a latching mechanism mounted beneath said platform proximate each of said rail assemblies for reciprocating movement with said platform, said latching mechanisms including a rotatable drum rotatably biased in a first direction, said drum having a circumferential wall selectively engageable with said base to prevent movement of said platform, said rotatable drum including a pair of oppositely disposed openings formed in said circumferential wall, said latching mechanism locking said platform against movement when said circumferential wall is biased into at least one notch of said guide flange and said latching mechanism releasing said platform for movement when said openings of said drum are aligned with said guide flange thereby retracting said circumferential wall from said at least one notch of said guide flange.

16. The load floor as defined in claim 15 wherein said latching mechanisms are operatively connected to a single control handle mounted to said platform, engagement of said control handle operatively overcoming said bias to release said latching mechanisms for reciprocal movement of said load platform.

17. The load floor as defined in claim 15 wherein said rail is reciprocatingly received within said track housing having interior walls, said rail supported in spaced apart relation from said interior walls of said track housing by bearing means engaging said rail and said interior walls of said track housing.

\* \* \* \* \*